J. JONES.

Running-Gear.

No. 191.

Reissued Mar. 4, 1851.

AM. PHOTO-LITHO. CO. N.Y. (OSBORNE'S PROCESS.)

UNITED STATES PATENT OFFICE.

JOHN JONES, OF CLYDE, NEW YORK.

IMPROVEMENT IN CARRIAGES.

Specification forming part of Letters Patent No. 7,906, dated January 14, 1851; Reissue No. 191, dated March 4, 1851.

*To all whom it may concern:*

Be it known that I, JOHN JONES, of Clyde, in the county of Wayne and State of New York, have invented a new and Improved Mode of Making or Constructing Carriage-Reaches; and I do hereby declare that the following is a full and exact description.

The nature of my invention consists in constructing carriage-reaches in such a manner as to prevent a rocking or zigzag motion on plank or descending roads, and also in an arrangement to allow the carriage to cramp any desired degree without having the wheels strike the body, to throw the wheels apart on the same side of the carriage by giving motion to the hind as well as the fore axle-tree, thus facilitating the ease of getting into and out of carriages, and rendering it impossible to upset the carriages by cramping.

To enable others skilled in the art to make and use my invention, I will proceed to describe its construction and operation.

Figure 2:
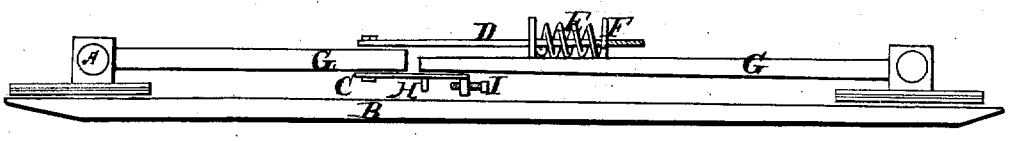
Figure 1:
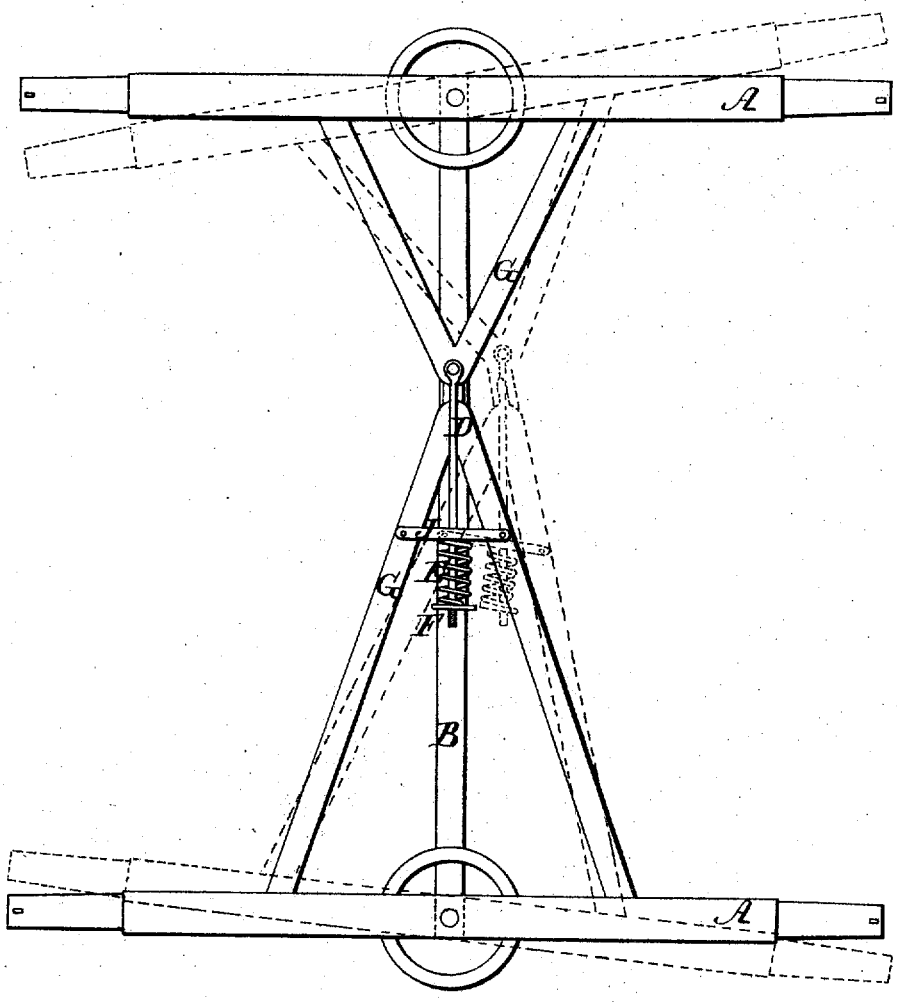

I construct my axle-trees in any of the known forms in use, (letters A A, Figure 1, in the accompanying drawings,) and attach one straight reach, B, Fig. 1, to the centers of the axle-trees, or to head-blocks turning on the centers of the axle-trees, in such a manner as to allow the hind and fore axle-trees to turn horizontally on the reach, or on king-bolts passing through the head-blocks. I then make two other bars or reaches in the form of a crotch or an acute angle, thus <, as shown by letters G G, Fig. 1, or curved in any form to suit the fancy, attaching the spread or open end of one firmly to the hind and the other to the fore axle-tree, the other ends approaching near to each other, above or below the straight reach. I then attach to one of these bars or reaches a rod, as shown by letter D, Fig. 1, in such a manner as to turn freely, the other end of the rod passing through a bar, (shown at I, Fig. 1.) I then place a spiral spring on on the end of the rod, which end has a thread cut on it for a nut, which nut by being turned graduates the stiffness of the spring, (see letters E F, Fig. 1.) It will be seen that this arrangement has a constant tendency to keep the reaches in a straight line, thereby preventing an unsteady motion, and also that the spring may be graduated by the nut, so as to allow the carriage to cramp to any desired degree. On the opposite side of these bars or reaches I attach a plate, as shown by letter C, Fig. 2, one end of which is secured to one of these reaches. The other end has a slot which works on the pin H, Fig. 2. The extreme end of this plate I bend at right angles with the reach, and in this end I place a gage-screw, I, Fig. 2, parallel with the reach. This screw may be moved to give the gearing any required degree of angle, as shown by Fig. 1. Or, instead of the slotted plate, pin, and gage-screw last described, I connect the two bars or reaches with any other extension hinge or joint, which will allow both axles to move as above described.

What I claim as my invention, and desire to secure by Letters Patent, is—

The arrangement of two bars or reaches placed in connection with the straight reach, as above described, and in combination with the spring, rod, and cross-bar, substantially in the manner described.

JOHN JONES.

Witnesses:

B. M. VAN DER VEER,
HIRAM P. JONES.